Oct. 17, 1967   R. J. CARBONI   3,347,550
CHECKER MAP GAME

Filed May 7, 1965   2 Sheets-Sheet 1

INVENTOR
Ralph J. Carboni

BY Tourover & Browdy

ATTORNEY

Oct. 17, 1967  R. J. CARBONI  3,347,550
CHECKER MAP GAME
Filed May 7, 1965  2 Sheets-Sheet 2
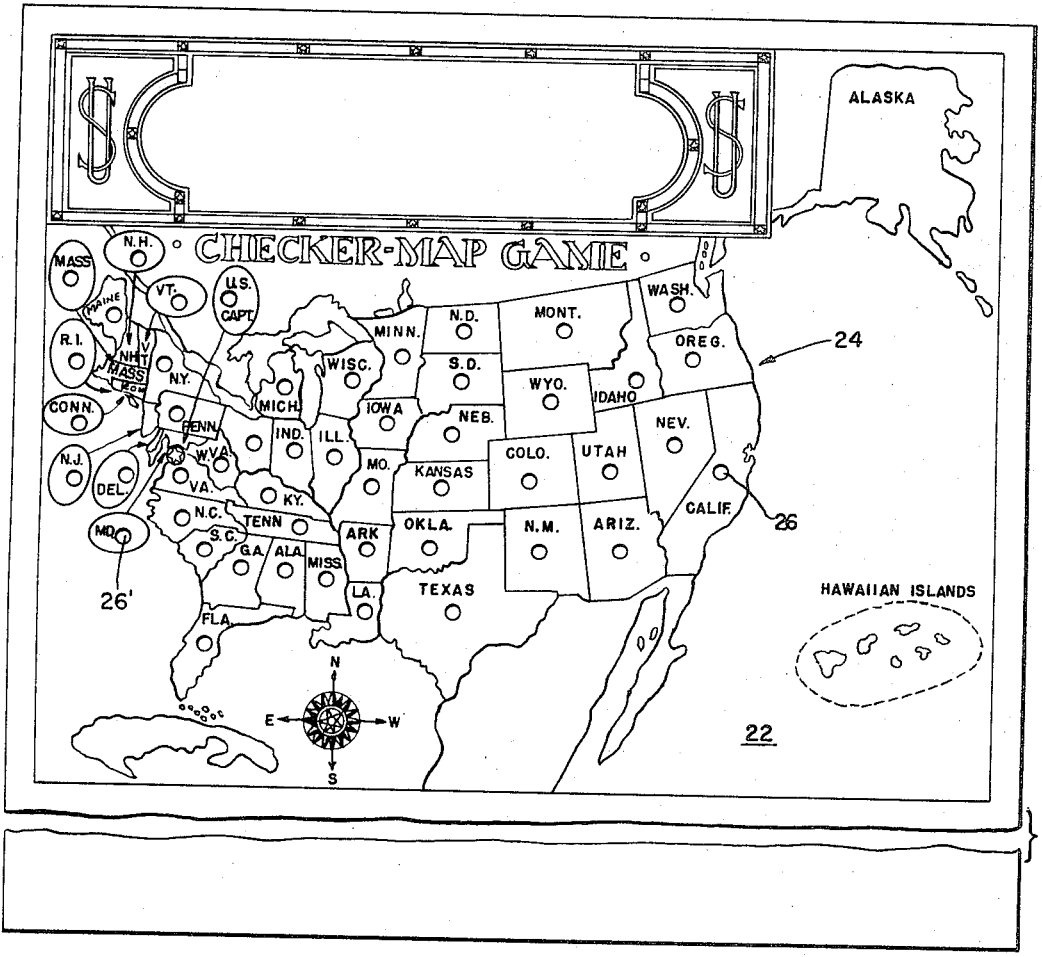
FIG. 3.
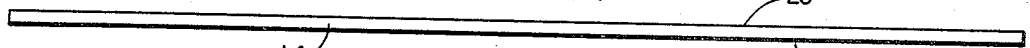
FIG. 4.
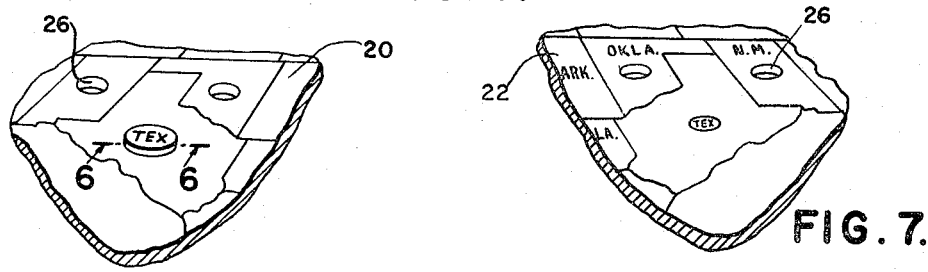
FIG. 5.
FIG. 6.
FIG. 7.
INVENTOR
Ralph J. Carboni
BY Tourover & Browdy
ATTORNEY

United States Patent Office 3,347,550
Patented Oct. 17, 1967

3,347,550
CHECKER MAP GAME
Ralph J. Carboni, 327 Sharon Drive,
New Orleans, La. 70124
Filed May 7, 1965, Ser. No. 454,004
5 Claims. (Cl. 273—130)

The present invention relates to a checker map game and, more particularly, to an educational checker game which teaches geography.

It is a prevalent theory today in education that the best type of educational devices are those which are interesting to a student and, in fact, those which make a game out of learning are often considered the best teaching devices. The teaching of geography has been particularly difficult due to the often uninteresting facts which must be learned, such as the locations of states and the names of the state capitals. Until the present time no devices have been provided which make such facts interesting to the student, particularly the young student.

It is therefore an object of the present invention to provide a geography teaching device.

It is another object of the present invention to provide for the teaching of locations, such as the locations of various states and/or state capitals.

It is another object of the present invention to teach the location of various different geographic areas in sequence.

It is another object of the present invention to provide a game which is interesting and fun to play and, in addition, teaches the location of different geographic areas.

Other objects and the nature and advantages of the instant invention will be apparent from the following description taken in conjunction with the accompanying drawings, wherein:

FIG. 3 is a bottom view, partly broken away, of the game board of FIG. 1;

FIG. 4 is an edge view of the game board of FIGS. 1 and 3;

FIG. 5 is a detail perspective view partly broken away of the top of the game board;

FIG. 6 is a section taken along line 6—6 of FIG. 5; and

FIG. 7 is a perspective view similar to FIG. 5 taken of the bottom of the board.

Figure 1:
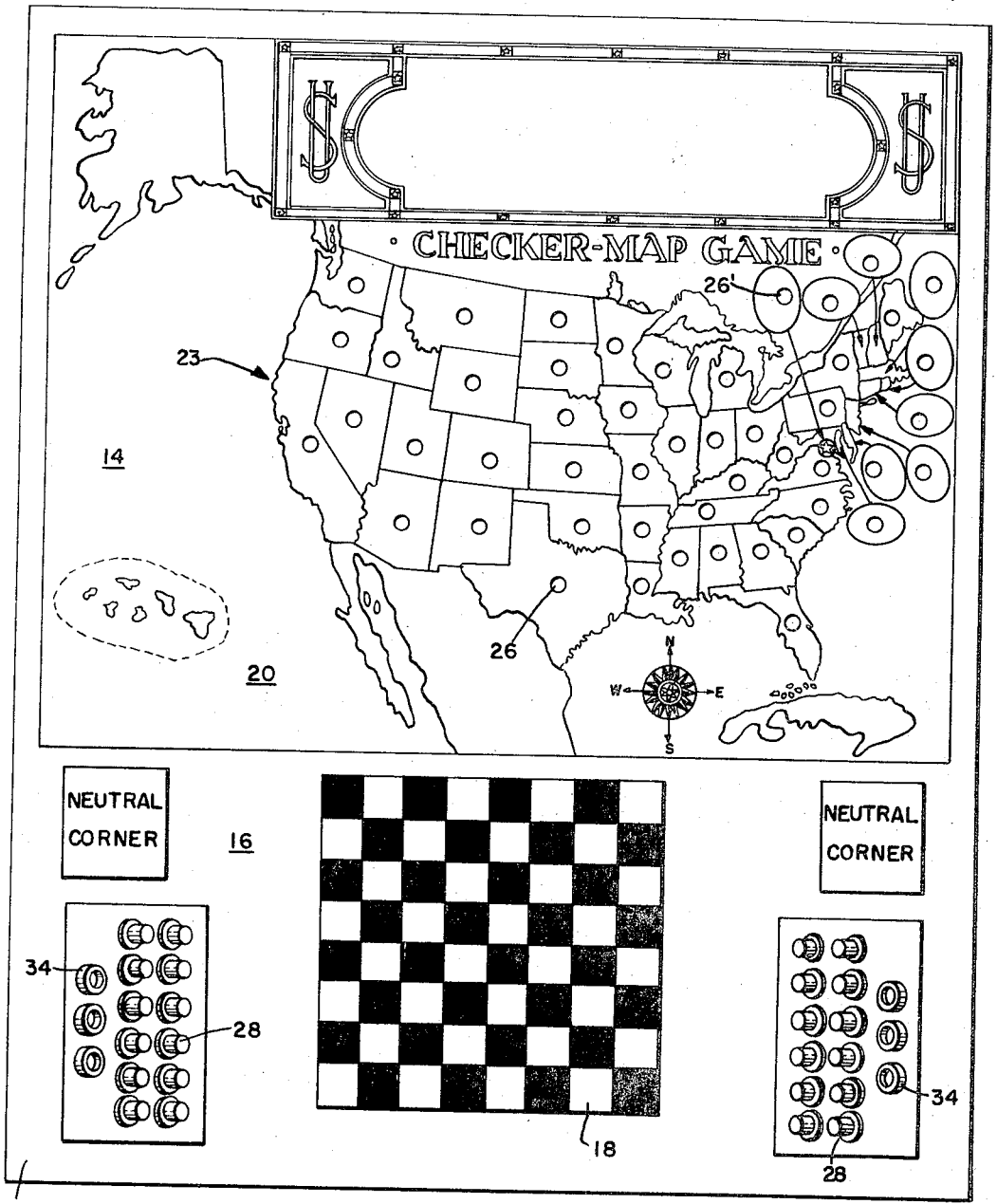
FIG. 1 is a top view of game board in accordance with the present invention.

A checker map game 10, in accordance with the present invention, generally comprises a board 12 having a first two-sided portion 14 having a suitable map 23 thereon on the first side 20 thereof and a second portion 16 having a conventional checkboard 18 thereon. If desired, the two-sided map portion 14 may be separate from the checkerboard portion 16 or an independent checkerboard 18 may be provided.

The two-sided map portion 14 may be provided with a map of any suitable area, but the preferred area is the United States, as shown in FIG. 1. Each of the first 48 states (or any 48 states, or 47 states and the District of Columbia) may be selected for teaching. In addition, and if desired, a plurality of two-sided map boards 14 may be provided of different geographical locations, each such map having 24 specific localities or a multiple thereof; in this way the geography of different parts of the world may be taught in sequence by playing the game with different map boards 14. Using the map of the United States as illustrated in FIG. 1, not only can the location of 48 states be taught, but also the location of the 48 state capitals.

The map board 14 is provided with two sides, a first or top side 20 illustrated in FIG. 1 and a second or bottom side 22 illustrated in FIG. 3. The first side 20 has a map 23 of the area desired to be taught arranged in the manner in which the map actually appears. The second or bottom side 22, on the other hand, has a reverse map 24 which is a mirror image of the actual map 23 on the first side 20 of the board 14. The reverse map 24 is exactly complementary to the actual map 23 being superimposed directly thereon and being of equal size. The board 14 is preferably of sufficient thickness, as shown in FIG. 4, to provide a rigid structure; e.g. the board 14 may be formed of paperboard of $\frac{1}{16}$ or $\frac{1}{8}$ inch thickness.

As indicated above, the given map must have at least 24 separate localities distinguishable as distinct geographic locations. Through each such locality is provided a hole or opening going from one side 20 to the other side 22 of the board 14. Such openings 26 may be of any suitable size or configuration, but all such holes should be the same size and configuration. If the locality to be designated is too small to receive the hole 26 therethrough, a hole 26' may be off-set from the actual locality with an arrow being drawn thereto in order to designate the proper locality in relation to the hole 26'. Under any conditions, one hole should be provided which will correspond to each locality desired to be taught.

Comparing FIGS. 1 and 3, it may be seen that the names of the localities are not provided on the first side 20 but are provided on the second side 22. The purpose for this will be explained in connection with the method for playing the game given below. While the reverse map 24 shows the names of the states thereon, it will be understood that the names of the capitals, or any other distinctive characteristics of the particular locality may be designated thereon either with or in place of the name of the locality.

Figure 2:
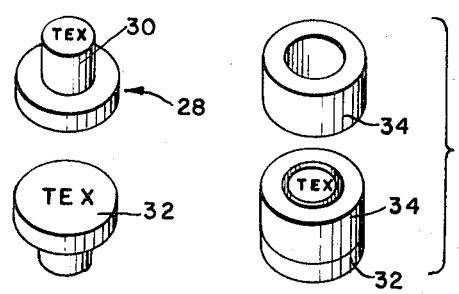
FIG. 2 is a perspective view of the checkers used in the present invention.

Checkers 28 are provided in the present invention and are illustrated in FIG. 2. Each checker 28 is generally T-shaped in cross-section and has an elongated portion 30 corresponding to the leg of the T and a large portion or base 32. The elongated portion 30 is adapted to fit within each of the holes 26 in the board 14 and extend therethrough to the back 22 thereof. Thus, if the board 14 has a thickness of $\frac{1}{8}$ inch, then the elongated portion 30 should be about $\frac{1}{8}$ inch in height, although it may be somewhat longer. Each of the checkers has the name of a different one of the localities of the map provided thereon in a suitable manner; e.g. the names may be inscribed or painted thereon. As shown in FIG. 2, the inscription is provided upon both sides of the checker.

In order to simplify the kinging of the checkers, king pieces 34 are provided which will fit over the elongated portions 30 of the checker. Preferably, the checkers 28 are round, as are the elongated portions 30 thereof; in such a case the openings 26 in the board 14 are also round to receive the elongated portions 30 and the king pieces are annular to fit over the elongated portions.

The checkerboard portion 16 may be provided with two areas designated "neutral corner," the purpose of which will become clear below upon a description of the method of playing the game. A plurality of sets of checkers are preferably provided with as many different indicia thereon as there are localities on the map having holes therethrough. Thus, if a map of the United States is provided with 48 localities, a total of 48 checkers may be provided in sets of 12, since each player during each game will use only 12 checkers. If a plurality of maps are provided with each game, then more checkers may be provided. If it is desired to teach more than one set of geographical facts with each map, then more checkers may be provided; thus, one set of checkers may be provided with the names of the states and another set with the names of the state capitals.

Each set of 12 checkers is preferably distinguished from each other set of 12 checkers and this may be done in the conventional manner by providing differently colored sets of 12 checkers each. In the case of the map of the United States, 12 checkers may be provided in each of the colors black, red, blue, and orange.

If desired, the checkerboard portion 16 may have any other information provided thereon which would be of interest to the players regarding the different localities and which information would be helpful in teaching such geographical information to the players; thus, for example, if the map of the United States were provided, the population, the area in square miles, the principal cities, the commodities grown, manufacturing, etc. could be given for each state on the board 16.

The game may be played as follows:

Actual maps of the area provided on the board 14 should be studied before the game is played. Such actual maps may be included in the game package and are preferably shown on the cover of the box in which the game is packaged. After studying the actual maps, 12 checkers should be selected by each player, such as one player selecting the black checkers and another selecting the red checkers. The checkerboard 18 is used in the conventional manner and a conventional game of checkers is played. Each time a checker is won by a player from his opponent, the player takes his opponent's checker and places it on the map 23 in the hole 26 corresponding to what he believes is the locality his opponent's checker designates. If this hole is already occupied by another checker, it may then be placed in the neutral corner on the player's side of the board.

When the game is completed, the board 14 is turned over so that the second side 22 is facing upwardly. At this time, the names on the checkers may be compared with the names written on the map 24. If the opponent has a checker in the wrong locality and the player has a checker in the neutral corner with the name of that locality inscribed thereon, then the opponent's checker is removed and replaced with the checker in the neutral corner. The player accurately placing the most checkers in the proper localities wins the game.

The game is very simple and yet is highly effective in teaching children geography. The game provides the competitive incentive which enables a child to learn the subject matter which is often, by itself, uninteresting. Even with a single map, such as one of the United States, a variety of geographical facts can be learned; thus, not only can the names of the states be learned, but checkers can be provided relating to the capitals of each state, other cities in each state, population, locations of mountains, etc.

It will be obvious to those skilled in the art that various changes may be made without departing from the spirit of the invention and therefore the invention is not limited to what is shown in the drawings and described in the specification, but only as indicated in the appended claims.

What is claimed is:

1. A checker map game comprising a two-sided board including a map divided into at least twenty-four localities on the first side of said board, a reverse map in mirror image of said first map on the second side of said board complementary to said first map, at least twenty-four uniformly sized openings disposed in said board passing between said two sides and corresponding to said twenty-four localities, said reverse map only having the name of each said locality adjacent each respective opening; a checkerboard associated with said first side; and at least twenty-four checkers, each having an elongated portion adapted to fit within said uniformly sized openings, each of said checkers having the name of a different said locality thereon, whereby when a checker is inserted into the first side, correctness of location can be verified by reference to the second side of said board.

2. A game in accordance with claim 1 further comprising a plurality of king pieces adapted to fit over the elongated portions of said checkers.

3. A game in accordance with claim 2, wherein said checkers are circular with a T shaped cross-section and said king pieces are annular and adapted to encircle the leg of said T.

4. A game in accordance with claim 1, wherein said checkerboard is integral with said two-sided board.

5. A game in accordance with claim 1, wherein said map is a map of the United States and has 48 localities comprising some of the states, said two-sided board having 48 openings therethrough corresponding to said localities, and said game being provided with two sets of 24 checkers.

References Cited

UNITED STATES PATENTS

| 535,194 | 3/1895 | Coen | 273—130 |
| 641,283 | 1/1900 | Evans | 35—40 |
| 1,349,587 | 8/1920 | Smith et al. | |
| 2,008,189 | 7/1935 | Rippon | 273—130 |

FOREIGN PATENTS

| 309,934 | 2/1918 | Germany. |
| 467,713 | 10/1928 | Germany. |
| 84,284 | 7/1920 | Switzerland. |
| 341,421 | 11/1959 | Switzerland. |

DELBERT B. LOWE, *Primary Examiner.*